Oct. 23, 1951  R. E. PRICE  2,572,385
SPEED CONTROL FOR HYDRAULIC SYSTEMS WITH
COMPENSATION FOR VISCOSITY CHANGES
Filed Jan. 29, 1948
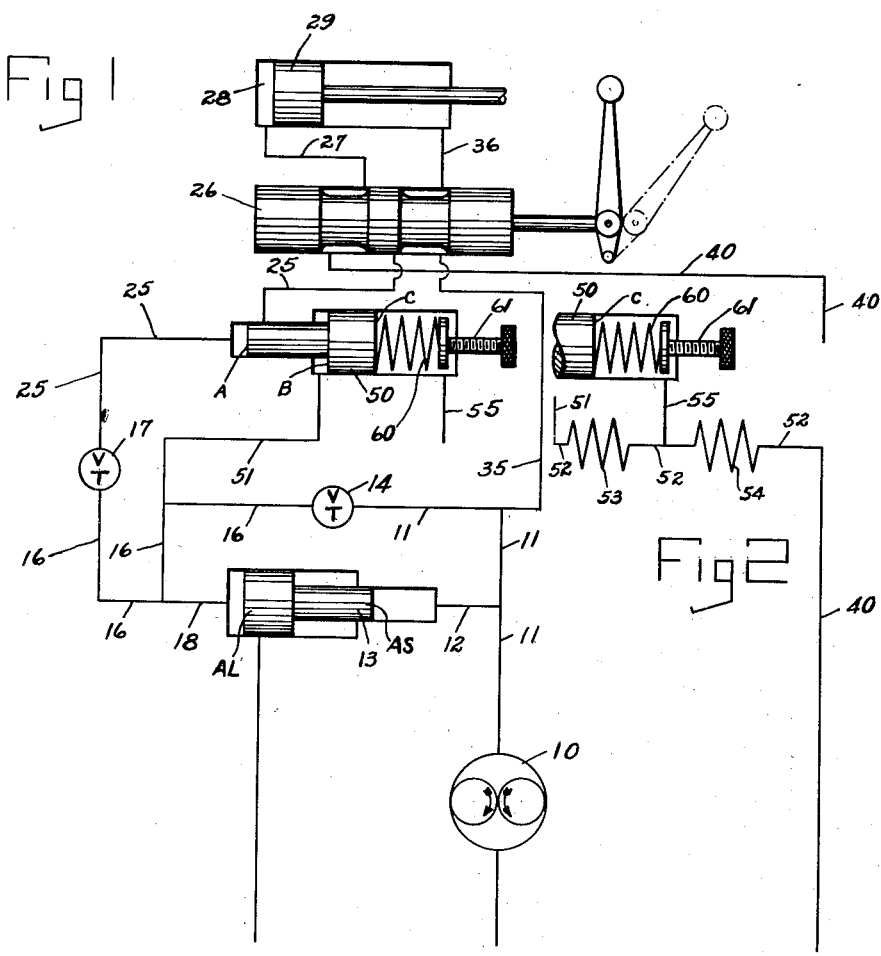
Inventor
RALPH E. PRICE
By
Hugh N. Rocks.
Attorney Patented Oct. 23, 1951

2,572,385

UNITED STATES PATENT OFFICE 2,572,385

SPEED CONTROL FOR HYDRAULIC SYSTEMS WITH COMPENSATION FOR VISCOSITY CHANGES

Ralph E. Price, Highfield, Md., assignor to Landis Tool Company, Waynesboro, Pa.

Application January 29, 1948, Serial No. 4,967

5 Claims. (Cl. 60—52)

This invention relates to hydraulic systems particularly to systems of the type having provision for compensation for viscosity and used in connection with feed and traverse mechanisms, etc. in metal working machines.

In copending application Serial No. 364,921, filed November 8, 1940, now Patent No. 2,456,431, granted December 14, 1948, is disclosed a pressure operated relief valve designed to produce a compensating change in pressure in order to maintain a substantially constant flow of fluid under pressure to a driven mechanism regardless of the temperature and therefore the viscosity of said fluid. This represented a decided improvement over the conventional spring actuated relief valve which maintains a constant pressure and therefore permits a rate of flow which varies with viscosity. However, it has been found that the action of this pressure operated relief valve can be improved by certain modifications of the hydraulic circuit.

While the device disclosed and claimed in said copending application compensates for variation in viscosity, this compensation is adequate only when the orifice which regulates the rate of flow of fluid to the driven mechanism is substantially of the same proportions as to area of opening and surface contacted by the fluid as the master orifice in the relief valve. This rate of flow valve has an orifice smaller than the master orifice. Therefore, since the area of the orifice is proportional to the square of the diameter, the smaller the orifice, the greater is the proportion of fluid contacting the surface of the orifice. Thus for a given change in viscosity, a constant flow of fluid through a small orifice will require a greater change in pressure than a constant rate of flow through a larger orifice. As the viscosity increases, the resistance to flow through the small orifice will increase at a greater rate than that of the larger orifice. By compensating for this difference in effect of viscosity change in cooperating orifices uniform movement of the driven member may be held within much closer limits.

It is therefore an object of this invention to provide in a hydraulic system an improved means for compensating for viscosity.

A further object is to provide means for equalizing the effect of a change in viscosity on orifices of different areas.

This difference in effect of viscosity may be compensated for in a number of different ways. The basic problem is to maintain a constant volume flow of fluid under pressure to a driven element.

If the speed control valve is set for a predetermined speed of the driven element an increase in viscosity will cause an increase in pressure drop across the master orifice because there will be no change in the rate of flow through this valve. The effect of the viscosity change will be greater on the speed control valve and therefore in the absence of any compensation the pressure drop will increase, but not enough to maintain a constant rate of flow from this valve to the driven element thus reducing the rate of movement of said element and the excess fluid will be exhausted through the relief valve. One method of overcoming this condition is to insert an adjustable resistance between the speed control valve and the driven element. Adjustment of this resistance is effected in response to a change in viscosity. An increase in viscosity causes an increase in pressure on the up-stream-side of the speed control valve, a reduction in this resistance and therefore an increase of pressure drop across the speed control valve supplying the driven element, to a pressure difference sufficient to keep the rate of flow thereto substantially unchanged.

In the drawing:

Figure 1 is a hydraulic diagram.

Figure 2 is an alternate method.

Numeral 10 is a constant volume pump connected through line 11 and a pressure regulating throttle valve 14 to a hydraulically operated mechanism. Line 12 connects line 11 with the small end of a pressure operated relief valve 13 of the type described in detail in Patent No. 2,456,431 mentioned above. A line 16 connects valve 14 with speed control throttle valve 17. Line 16 is connected to the large end of relief valve 13 through line 18.

Valve 17 has a smaller opening than valve 14 and therefore the reaction to a change in viscosity of fluid passing therethrough is more pronounced than that of valve 14. For this reason, changes in viscosity result in a change in rate of flow of fluid through valve 14 and therefore a change in rate of movement of any device driven by said fluid.

In this case the driven member is a feed piston similar to position 70 in Patent No. 2,335,356 granted November 30, 1943.

Ordinarily fluid under pressure from valve 17 passes through line 25 to valve 26 from which it may be directed through line 27 to the head end of cylinder 28 containing piston 29. The rod end of said piston is subjected to a constant pressure direct from pump 10 through lines 11 and 35 to valve 26 which in all positions directs said fluid through line 36 to the rod end of piston 29. In Figure 1 the position of valve 26 is such that line 27 is connected to exhaust passage 40. Because of the difference in area of the two sides of piston 29, the total pressure on the head end is greater than that on the rod end of piston 29. Therefore, since the rod end is under pressure all the time, the head end must be connected through valve 26 to exhaust passage 40 in order to permit resetting of piston 29 by the fluid acting on the rod end thereof.

However, in order to compensate for the difference in response of valves 14 and 17 to changes in viscosity, a pressure operated amplifying valve 50 is inserted in line 25. Valve 50 may be similar in shape to valve 13, that is, it has differential areas exposed to fluid under pressure. The small end A of valve 50 is inserted in line 25 so that said valve must be shifted in order to permit fluid from speed control valve 17 to pass to valve 26. An intermediate surface B of valve 50 facing in the same direction as the small end thereof is connected to line 16 through line 51. Any change of viscosity in the passage of fluid through line 16 is reflected in the pressure on the intermediate surface B of amplifying valve 50. Valve 50 is urged in the opposite direction by a spring 60 which should exert a force somewhat in excess of the highest force imposed on surface B by pressure in line 51. The exact force exerted by spring 60 must be determined by trial. Said spring must be adjusted by screw 61 until the piston 29 moves at a uniform speed for all conditions of viscosity. An exhaust outlet 55 serves to relieve excess fluid in the left end of the valve cylinder of valve 50.

As an alternate arrangement line 51 may be connected to exhaust line 40 through line 52, Figure 2, in which are a pair of spaced restrictions 53 and 54. A line 55 connects the large end C of valve 50 with line 52 at a point between said restrictions. The fluid pressure acting on the large end of valve 50 supplements the force exerted by spring 60. The force exerted by said spring may be adjusted by screw 61. When spring 60 is supplemented by fluid under pressure, the total force exerted by spring and fluid should be the maximum pressure required in the operation of the machine, i. e., the pressure applied at surface B.

*Operation*

The operation of valve 13 has been explained in detail in the above mentioned Patent No. 2,456,431 and will be discussed here only in its relation to valves 17 and 50. Valves 13 and 14 cooperate to provide a pressure in line 16 which varies in relation to any change in viscosity.

The requirement of a variable speed for piston 29 necessitates a speed control valve 17 in the system. The opening in valve 17 is necessarily smaller than that in valve 14. Therefore, any change in viscosity will be more pronounced because a greater proportion of the orifice area of valve 17 will be in contact with the fluid. In order to compensate for this difference in friction characteristic an amplifying valve such as valve 50 is provided. The function of this valve may be best explained by a few typical examples.

Assume area of feed cylinder 28 is 10 sq. in.
Movement required is .060 in./sec.
Volume = .060 × 10 = .6 cu. in./sec. or 36 cu. in./min.
5 gal. pump = 5 × 231 = 1155 cu. in./min.
AL = area large end valve 13
AS = area small end valve 13
A = small end valve 50
B = intermediate surface valve 50
$\frac{1155}{36} = 32$ to 1 ratio of flow through the two throttle valves 14 and 17 respectively.

Due to this ratio the frictional resistance of the smaller valve will increase more with a given increase of viscosity than will the frictional resistance of the large valve. Due to a difference of valve construction this ratio of frictional resistance may be 5 to 1 instead of 32 to 1.

I

Assume areas of relief valve 13 are AS, 1 sq. in. and AL, 1½ sq. in.
Assume the machine pressure is 100 p. s. i. with oil at normal operation temperature.

$$100 \times 1.5 = \frac{150\#}{1} \text{ force } = 150 \text{ p. s. i.}$$

on the pump side of relief valve.

$150 - 100 = 50$ p. s. i. drop across the relief valve throttle valve 14 which is passing 5 gal./min.

Assume the amplifying valve 50 has an area A of 1 sq. in. opposing the passage of oil to the feed cylinder 28, an area B of ½ sq. in. exposed to machine pressure, and a spring 60 of 100# opposing both areas. Then the pressure drop across the feed rate valve 17 will be $$100 \text{ p. s. i. minus} \frac{(100\# - 100\#/\text{sq. in.} \times .5)}{1}$$

or 50 p. s. i. which is the same as the drop across the master orifice 14.

II

Now assume the viscosity is increased due to reduced oil temperature so that 10% or 5 p. s. i. more pressure is required to force the same volume of oil through the master orifice 14. The pressure drop across the master orifice 14 will now be 55 p. s. i. instead of 50 p. s. i.

Machine pressure X will now be $$1.5X = X + 55$$

$$X = \frac{55}{.5}$$

$$X = 110$$

Pressure drop across the feed rate valve 17 will now be $$110 - [100 - (110 \times .5)] = 65 \text{ p. s. i.}$$

so that we now have an increase of $65 - 50 = 15$ p. s. i. in pressure drop which is $$\frac{15}{50} = 30\%$$

increase at 17 instead of 10% as at 14. Since the ratio of orifice resistance is 5 to 1 we should have a 50% increase at 17 to equal 10% increase on the master orifice 14. This indicates that the spring is too small a factor.

III

Assume a change in spring pressure to 120#. The pressure drop now will be $$100 - (120 - 100 \times .5) = 30 \text{ p. s. i. initial drop}$$

With the 10% increase in viscosity we will have $$110 - (120 - 110 \times .5) = 45 \text{ p. s. i. drop} = 50\% \text{ increase of pressure drop}$$

With 20% increase in pressure drop at 14, $X = 120$.

$$120 - (120 - 120 \times .5) = 60 \text{ p. s. i.} = 100\% \text{ increase or } 5 \times 20\%$$

IV

Assume the valve resistance ratio is only 2 to 1 instead of 5 to 1. Then less spring pressure must be applied. But the spring pressure must always be greater than machine pressure X on the area B of the amplifying valve 50 exposed to machine pressure, in this case ½ sq. in. Since our machine pressure may go as high as 200 p. s. i. or 100# force on the valve we cannot use less than a 100# spring. Then the initial pressure drop would be $$100-(100-100\times.5)=50 \text{ p. s. i.}$$

The pressure drop with a 10% rise of machine pressure would be $$110-(100-110\times.5)=65$$

$$65-50=15 \text{ p. s. i. increase of pressure drop}$$

$\frac{15}{50}=30\%$ increase for a 10% rise of machine pressure

Since the ratio is 2 to 1 the feed rate valve pressure drop should only increase 20%. This indicates that the spring is too strong. But since the force on the spring end must always equal or exceed the force exerted by machine pressure the spring force cannot be reduced except if it be aided by another force which will vary in relation to the change in machine pressure.

V

However, instead of using the double resistance as a means of aiding the spring to balance the force of machine pressure the same result can be obtained more satisfactorily by reducing the area B effected by machine pressure.

Assume the area B is reduced to .3 sq. in. and the 100# spring replaced by a 75# spring, then $$100\# \text{ p. s. i.} - \frac{(75\#-100\times.3)}{1}=55 \text{ p. s. i. drop}$$

$$110-(75-110\times.3)=68$$
$$\underline{55}$$
$$13$$
$$\frac{13}{50}=26\% \text{ increase}$$

which means that the spring is still too strong.

Assume we use 65# spring $$100-(65-100\times.3)=65$$
$$110-(65-110\times.3)=78$$
$$\underline{65}$$
$$13$$
$$\frac{13}{65}=20\%$$

The change in spring pressure may be effected by means of adjusting screw 61.

From the above examples it is clear that, knowing the ratio between valves 14 and 17 a combination spring loading and valve area may be determined which will compensate for the difference in response by said valves to different fluid viscosities.

I claim:

1. In a hydraulic system, a supply of fluid under pressure, a driven member, a valve for controlling the rate of flow of fluid to said driven member and hence the speed of said member, means for supplying a constant volume of fluid under pressure flowing through a master orifice to said speed control valve, a pressure operated relief valve in the line from the master orifice to the speed control valve arranged to compensate for changes in viscosity of said fluid, and means to compensate for the difference in response to viscosity change between said master orifice and said speed control valve including an amplifying valve between said speed control valve and said driven element responsive to any change in pressure of said fluid on the upstream side of said speed control valve to cause an opposite change in pressure on the down stream side of said speed control valve whereby to cause fluid to flow through said feed control valve at the same rate as through said master orifice.

2. In a hydraulic system, a supply of fluid under pressure, a driven member, a valve for controlling the rate of flow of fluid to said driven member and hence the speed of said member, means for supplying a constant volume of fluid under pressure flowing through a master orifice to said speed control valve and a pressure operated relief valve in the line from the master orifice to the speed control valve arranged to compensate for changes in viscosity of said fluid, and means to compensate for the difference in response to viscosity change between said master orifice and said speed control valve including an amplifying valve having a small area exposed to the pressure between feed control valve and the driven member and preventing passage of fluid to said motor until a predetermined pressure is reached, an intermediate area supplementing said small area and responsive to change in pressure between the pressure operated relief valve and said feed control valve due to change in viscosity, and a large area on said valve exposed to a predetermined pressure and opposed to said small and intermediate areas.

3. A hydraulic system comprising a source of fluid under pressure, a pressure operated relief valve, a valve for regulating the operating pressure in the system, a hydraulically operated mechanism, a speed control valve for said mechanism having a smaller orifice than said pressure regulating valve, and means for compensating for the difference in effect on said valves of changes in viscosity which consists in means for changing the pressure required to cause fluid to flow from said speed control valve to said hydraulically operated mechanism in accordance with change in the pressure of said fluid between said regulating valve and said speed control valve.

4. A hydraulic system comprising a source of fluid under pressure, a pressure operated relief valve, a valve for regulating the operating pressure in the system, a hydraulically operated mechanism, a speed control valve for said mechanism having a smaller orifice than said pressure regulating valve, and means for providing a pressure drop across said speed control valve sufficient to cause fluid to pass therethrough at substantially the same rate as through said pressure regulating valve regardless of change in viscosity of said fluid.

5. In a hydraulic system, a supply of fluid under pressure, a driven member, a valve for controlling the rate of flow of fluid to said driven member and hence the speed of said member, means for supplying a constant volume of fluid under pressure flowing through a master orifice to said speed control valve and a pressure operated relief valve in the line from the master orifice to the speed control valve arranged to compensate for changes in viscosity of said fluid, and means to compensate for the difference in response to viscosity change between said master orifice and said speed control valve including a balancing valve having a portion for controlling the flow of fluid under pressure to said driven member, a second portion connected to the line between said feed control valve and said pressure operated relief valve, and a portion opposed to said first two portions and acted upon by resilient means exerting a force in excess of that acting upon said second portion.

RALPH E. PRICE.

REFERENCES CITED

The following references are of record in the file of this patent:

UNITED STATES PATENTS

| Number | Name | Date |
|---|---|---|
| 2,005,731 | Ernst | June 25, 1935 |
| 2,456,431 | Price | Dec. 14, 1948 |